United States Patent
Rouvala et al.

(10) Patent No.: US 12,542,553 B2
(45) Date of Patent: Feb. 3, 2026

(54) APPARATUS AND METHODS FOR SENSING

(71) Applicant: Nokia Technologies Oy, Espoo (FI)

(72) Inventors: Markku Rouvala, Helsinki (FI); Helena Pohjonen, Espoo (FI); Vuokko Lantz, Vantaa (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/303,986

(22) Filed: Jun. 11, 2021

(65) Prior Publication Data

US 2021/0305984 A1 Sep. 30, 2021

Related U.S. Application Data

(63) Continuation of application No. 15/546,655, filed as application No. PCT/FI2016/050030 on Jan. 21, 2016, now abandoned.

(30) Foreign Application Priority Data

Feb. 9, 2015 (EP) ..................................... 15154247

(51) Int. Cl.
*H03K 19/0175* (2006.01)
*G06F 3/041* (2006.01)
(Continued)

(52) U.S. Cl.
CPC ......... *H03K 19/0175* (2013.01); *G06F 3/041* (2013.01); *G06F 3/0412* (2013.01);
(Continued)

(58) Field of Classification Search
CPC ............. H03K 19/0175; H03K 17/962; H03K 17/9625; H03K 17/9643; H03K 17/9647;
(Continued)

(56) References Cited

U.S. PATENT DOCUMENTS

| 5,536,932 A | 7/1996 | Hack |
| 7,683,953 B1 | 3/2010 | Merrill |

(Continued)

FOREIGN PATENT DOCUMENTS

| CN | 102832927 A | 12/2012 |
| CN | 103954794 A | 7/2014 |

(Continued)

OTHER PUBLICATIONS

Cho et al., "Effects of Infrared Radiation and Heat on Human Skin Aging In Vivo", Journal of Investigative Dermatology Symposium Proceedings, vol. 14, No. 1, Aug. 2009, pp. 15-19.

(Continued)

*Primary Examiner* — Jimmy H Nguyen
(74) *Attorney, Agent, or Firm* — ALSTON & BIRD LLP

(57) ABSTRACT

An apparatus and method wherein the apparatus comprises; a sensor arrangement comprising a plurality of sensor cells wherein a sensor cell comprises a transistor and a sensor coupled to the transistor; first selection circuitry configured to sequence a subset of sensor cells to which a gate input signal is provided, wherein the gate input signal is provided to the gate of the transistors within the sensor cells; second selection circuitry configured to sequence a subset of sensor cells from which an output signal is received; sensing signal circuitry configured to provide a sensing signal, wherein the sensors are provided between the sensing signal circuitry and the second selection circuitry such that the output signal provides an indication of the impedance of the sensors.

42 Claims, 6 Drawing Sheets

(51) Int. Cl.
  *G06F 3/044* (2006.01)
  *G06F 3/045* (2006.01)
  *H03K 17/96* (2006.01)
  *H04N 25/00* (2023.01)
  *H04N 25/20* (2023.01)

(52) U.S. Cl.
  CPC ...... *G06F 3/041661* (2019.05); *G06F 3/0446* (2019.05); *G06F 3/045* (2013.01); *H03K 17/9625* (2013.01); *H03K 17/9643* (2013.01); *H03K 17/9647* (2013.01); *H04N 25/00* (2023.01); *H04N 25/20* (2023.01); *H03K 17/962* (2013.01); *H03K 2217/960715* (2013.01)

(58) Field of Classification Search
  CPC .. G06F 3/0446; G06F 3/041661; G06F 3/045; G06F 3/041; G06F 3/0412; G06F 3/0416; G06F 3/0418; H04N 5/335; H04N 5/33; H04N 25/00; H04N 25/20
  USPC .................................................. 345/173, 174
  See application file for complete search history.

(56) References Cited

U.S. PATENT DOCUMENTS

| | | | |
|---|---|---|---|
| 2008/0137525 A1* | 6/2008 | Liu | H04L 25/0232 375/346 |
| 2008/0217508 A1 | 9/2008 | Sakuragi et al. | |
| 2008/0319282 A1 | 12/2008 | Tran | |
| 2010/0002120 A1 | 1/2010 | Yoshikawa et al. | |
| 2010/0315540 A1 | 12/2010 | Hoshino | |
| 2011/0204247 A1 | 8/2011 | Kasai et al. | |
| 2013/0041235 A1 | 2/2013 | Rogers et al. | |
| 2013/0200268 A1 | 8/2013 | Rafferty et al. | |
| 2014/0013865 A1 | 1/2014 | White | |
| 2014/0176110 A1 | 6/2014 | Lamar et al. | |
| 2014/0266262 A1 | 9/2014 | Taghibakhsh | |
| 2014/0267299 A1 | 9/2014 | Couse | |
| 2014/0275824 A1 | 9/2014 | Couse | |
| 2018/0024688 A1* | 1/2018 | Rouvala | H03K 17/9625 345/174 |

FOREIGN PATENT DOCUMENTS

| | | |
|---|---|---|
| JP | S6416902 | 1/1989 |
| JP | 2000-055874 | 2/2000 |
| JP | 2003-532111 A | 10/2003 |
| JP | 2005-287773 | 10/2005 |
| JP | 2009-003916 | 1/2009 |
| JP | 2009-047675 | 3/2009 |
| JP | 2009-224519 A | 10/2009 |
| JP | 2010-016656 | 1/2010 |
| JP | 2011-174793 | 9/2011 |
| JP | 2011-237410 | 11/2011 |
| JP | 2013-149074 A | 8/2013 |
| JP | 2013-540267 A | 10/2013 |
| WO | WO-2012047515 A1 | 4/2012 |
| WO | WO-2013102850 A1 | 7/2013 |
| WO | WO-2014110176 A1 | 7/2014 |

OTHER PUBLICATIONS

Ersman et al., "Fast-switching all-printed organic electrochemical transistors", Organic Electronics, vol. 14, No. 5, pp. 1-14.
Eshkeiti et al., "A Novel Self-Supported Printed Flexible Strain Sensor for Monitoring Body Movement and Temperature", IEEE Sensors Proceedings, Nov. 2-5, 2014, 4 pages.
Extended European Search Report received for corresponding European Patent Application No. 15154247.9, dated May 4, 2015, 7 pages.
Force-Sensing Resistor, Wikipedia, Retrieved on Jul. 27, 2017, Webpage available at : https://en.wikipedia.org/wiki/Force-sensing resistor, 2 pages.
Harada et al., "Fully Printed, Large-Scale, High Sensitive Strain Sensor Array for Stress Monitoring Of Infrastructures", International Conference on Micro Electro Mechanical Systems, Jan. 26-30, 2014, pp. 737-740.
Honda et al., "Printed Wearable Temperature Sensor for Health Monitoring", IEEE Sensors Proceedings, Nov. 2-5, 2014, 3 pages.
Intention to Grant for European Application No. 15 154 247.9 dated Oct. 30, 2019, 6 pages.
International Search Report and Written Opinion received for corresponding Patent Cooperation Treaty Application No. PCT/FI2016/050030, dated Apr. 26, 2016, 12 pages.
Jang et al., "Rugged and Breathable Forms of Stretchable Electronics with Adherent Composite Substrates for Transcutaneous Monitoring", Nature Communications, 2014, pp. 1-10.
Johnson et al., "Design and Testing of an Impedance-Based Sensor for Monitoring Drug Delivery", Journal of The Electrochemical Society, vol. 152, No. 1, 2005, pp. H6-H11.
Kawahara et al., "Flexible Active Matrix Addressed Displays Manufactured By Printing and Coating Techniques", Journal of Polymer Science Part B: Polymer Physics, vol. 51, No. 4, 2012, 19 pages.
Narakathu et al., "A Novel Gravure Printed Impedance Based Flexible Electrochemical Sensor", IEEE Sensors ³roceedings, Oct. 28-31, 2011, 4 pages.
Notice of Allowance for U.S. Appl. No. 15/546,655 dated Mar. 12, 2021.
Office Action for Chinese Application No. 201680009215.7 dated Aug. 10, 2020, 21 pages.
Office Action for Chinese Application No. 201680009215.7 dated Dec. 3, 2020, with English translation, 7 pages.
Office Action for Chinese Application No. 201680009215.7 dated Feb. 27, 2020, 12 pages.
Office Action for Mexican Application No. MX/a/2017/010307 dated Nov. 8, 2019, 4 pages.
Office Action for U.S. Appl. No. 15/546,655 dated Apr. 8, 2020.
Office Action for U.S. Appl. No. 15/546,655 dated Jul. 16, 2019.
Office Action for U.S. Appl. No. 15/546,655 dated Sep. 6, 2019.
Office action received for corresponding European Patent Application No. 15154247.9, dated Sep. 18, 2018, 6 pages.
Office action received for corresponding Japanese Patent Application No. 2017-541809, dated Sep. 18, 2018, 3 pages of office action and 5 pages of translation available.
Office action received for Japanese Patent Application No. 2017-541809 dated May 22, 2019, 8 pages.
Office action received for U.S. Appl. No. 15/546,655, dated Dec. 11, 2018, 32 pages.
OSI Optoelectronics, "Photodiode Characteristics and Applications", 2018, pp. 1-3.
Petersen et al., "Skin Temperature during Sunbathing-Relevance for Skin Cancer", Photochemical & Photobiological Sciences, vol. 13, No. 8,2014, pp. 1123-1125.
Printed Electronic Technologies, Rise Acreo, Retrieved on Jul. 27, 2017, Webpage available at : https://www.acreo.se/expertise/printed-electronic-technologies, 11 pages.
Rise Acreo, Acreo, Retrieved on Jul. 27, 2017, Webpage available at : https://www.acreo.se/, 3 pages.
Shitanda et al., "Screen-Printed Atmospheric Corrosion Monitoring Sensor Based On Electrochemical Impedance Spectroscopy", Sensors and Actuators B: Chemical, vol. 139, No. 2, Jun. 4, 2009, pp. 292-297.
Thoelen et al., "A MIP-based Impedimetric Sensor for the Detection of low-MW Molecules". Biosensors and Bioelectronics, vol. 23, No. 6, Jan. 2008, 13 pages.
Thompson et al., "Method of Measuring Shunt Resistance in Photodiodes", Measurement Science Conference 2001, (Jan. 2001), pp. 1-7.
Turner, "Biosensors: Sense and Sensibility", Chemical Society Reviews, vol. 42, No. 8, 2013, pp. 3184-3196.
Webb et al., "Ultrathin Conformal Devices for Precise and Continuous Thermal Characterization of Human Skin", Nature Materials, vol. 12, Oct. 2013, pp. 938-944.

(56) References Cited

OTHER PUBLICATIONS

Zirkl et al—"Fully Printed, Flexible, Large Area Organic Optothermal Sensors for Human-Machine-Interfaces", Procedia Engineering, vol. 5, 2010, pp. 725-729.
Office Action for Philippine Application No. Jan. 2017/501398 dated Mar. 25, 2022, 6 pages.
Office Action for Philippine Application No. 1/2017/501398 dated Jun. 17, 2022, 5 pages.

\* cited by examiner

APPARATUS AND METHODS FOR SENSING

CROSS-REFERENCE TO RELATED APPLICATIONS

This application is a continuation of co-pending U.S. patent application Ser. No. 15/546,655, titled "An Apparatus and Methods for Sensing," which was filed Jul. 26, 2017 as a National Phase entry of International Patent Application No. PCT/FI2016/050030, filed Jan. 21, 2016, which claims priority to and the benefit of European Patent Application No. 15154247.9, filed Feb. 9, 2015, the entire disclosures of which are hereby incorporated herein by reference in their entireties for all purposes.

TECHNICAL FIELD

Examples of the disclosure relate to an apparatus and method of providing an apparatus for sensing. In particular, they relate to an apparatus and method of providing an apparatus which may comprise a plurality of sensors.

BACKGROUND

Sensors which enable attributes such as user inputs and environmental parameters to be sensed are known. Such sensors may comprise a material which produces a measurable change in electrical properties in response to the attributes. It may be useful to arrange such sensors into an array comprising a plurality of sensor elements. This may enable a single apparatus to detect a plurality of different attributes. In some examples this may enable a single apparatus to detect the same attribute or attributes in a plurality of locations and/or at a plurality of different times.

It is useful to be able to read signals from the array of sensors to obtain information indicative of the attribute or attributes which have been sensed and/or information about the distribution of the attribute over the area covered by the array.

BRIEF SUMMARY

According to various, but not necessarily all, examples of the disclosure there may be provided an apparatus comprising; a sensor arrangement comprising a plurality of sensor cells wherein a sensor cell comprises a transistor and a sensor coupled to the transistor; first selection circuitry configured to sequence a subset of sensor cells to which a gate input signal is provided, wherein the gate input signal is provided to the gate of the transistors within the sensor cells; second selection circuitry configured to sequence a subset of sensor cells from which an output signal is received; sensing signal circuitry configured to provide a sensing signal, wherein the sensors are provided between the sensing signal circuitry and the second selection circuitry such that the output signal provides an indication of the impedance of the sensors.

In some examples the second selection circuitry may comprise an analogue multiplexer configured to receive a complex output signal from the sensor cells.

In some examples the second selection circuitry may comprise the plurality of sensor cells are arranged in a plurality of rows and columns. The columns may be orthogonal to the rows. In some examples the first selection circuitry may be configured to sequence through a series of different rows and the second selection circuitry may be configured to sequence through a series of different columns.

In other examples the first selection circuitry may be configured to sequence through a series of different columns and the second selection circuitry may be configured to sequence through a series of different rows.

In some examples the sensor may be connected in series with the transistor within the sensor cell. In other examples the sensor may be connected in parallel with the transistor within the sensor cell.

In some examples the transistor may comprise a thin film transistor.

In some examples the data input signal may comprise an alternating current signal.

In some examples the sensor may comprise a material which changes impedance in dependence on a sensed attribute.

In some examples the sensor may comprise a material which changes resistance in response to the sensed attribute.

In some examples the sensor may comprise a material which changes permittivity in response to the sensed attribute.

In some examples the apparatus may further comprise at least one transmitter configured to transmit information obtained from the output signal.

According to various, but not necessarily all, examples of the disclosure there may be provided a communication device comprising an apparatus as described above.

According to various, but not necessarily all, examples of the disclosure there may be provided a method comprising; providing a sensor arrangement comprising a plurality of sensor cells wherein a sensor cell comprises a transistor and a sensor coupled to the transistor; providing first selection circuitry configured to sequence a subset of sensor cells to which a gate input signal is provided, wherein the gate input signal is provided to the gate of the transistors within the sensor cells; providing second selection circuitry configured to sequence a subset of sensor cells from which an output signal is received; providing sensing signal circuitry configured to provide a sensing signal, wherein the sensors are provided between the sensing signal circuitry and the second selection circuitry such that the output signal provides an indication of the impedance of the sensors.

In some examples the second selection circuitry may comprise an analogue multiplexer configured to receive a complex output signal from the sensor cells.

In some examples the plurality of sensor cells may be arranged in a plurality of rows and columns. In some examples the columns may be orthogonal to the rows. In some examples the first selection circuitry may be configured to sequence through a series of different rows and the second selection circuitry may be configured to sequence through a series of different columns. In other examples the first selection circuitry may be configured to sequence through a series of different columns and the second selection circuitry may be configured to sequence through a series of different rows.

In some examples the sensor may be connected in series with the transistor within the sensor cell. In other examples the sensor may be connected in parallel with the transistor within the sensor cell.

In some examples the transistor may comprise a thin film transistor.

In some examples the data input signal may comprise an alternating current signal.

In some examples the sensor may comprise a material which changes impedance in dependence on a sensed attribute.

In some examples the sensor may comprise a material which changes resistance in response to the sensed attribute.

In some examples the sensor may comprise a material which changes permittivity in response to the sensed attribute.

In some examples the method may further comprise providing at least one transmitter configured to transmit information obtained from the output signal.

According to various, but not necessarily all, examples of the disclosure there may be provided examples as claimed in the appended claims.

BRIEF DESCRIPTION OF THE DRAWINGS

For a better understanding of various examples that are useful for understanding the brief description, reference will now be made by way of example only to the accompanying drawings in which.

DETAILED DESCRIPTION

Figure 1:
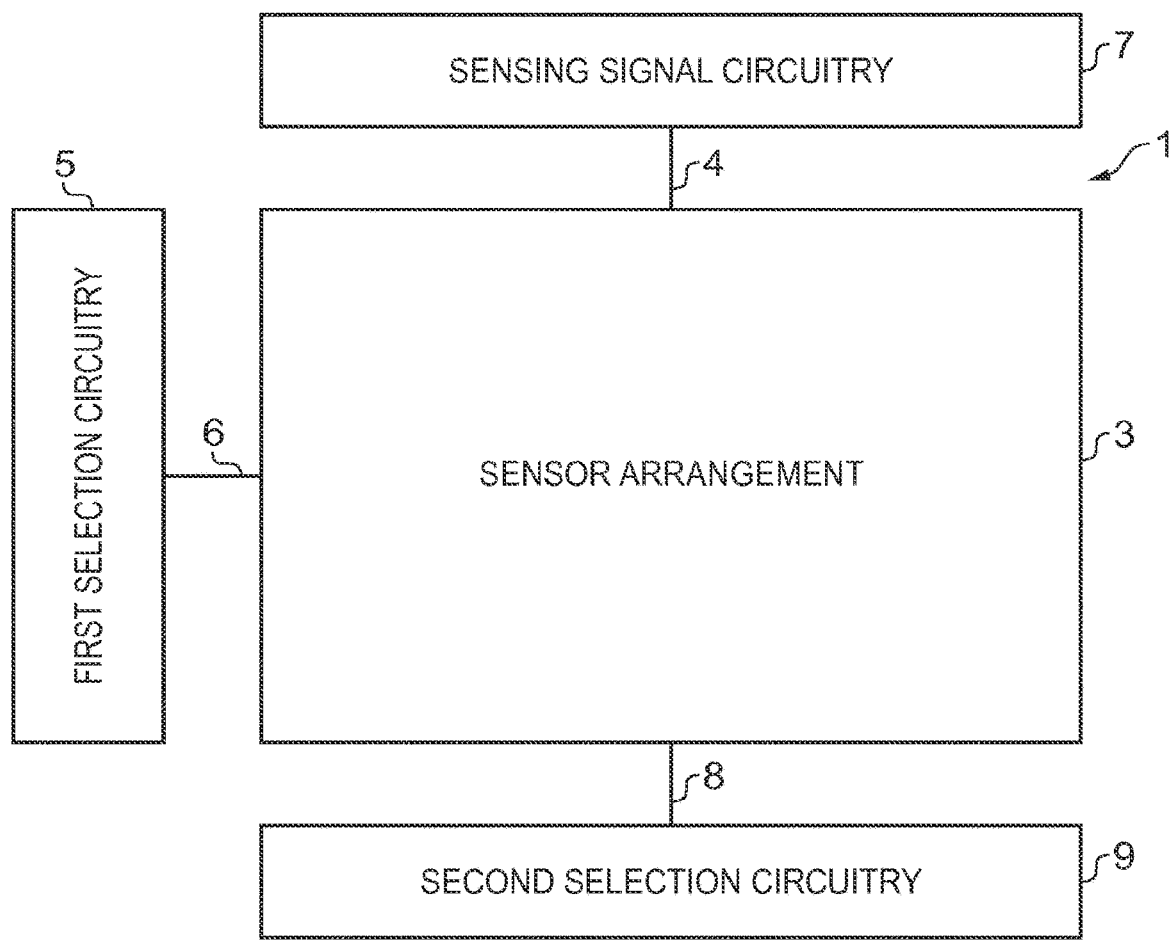
FIG. 1 illustrates an apparatus.

The Figures illustrate an apparatus 1 comprising; a sensor arrangement 3 comprising a plurality of sensor cells 35 wherein a sensor cell 35 comprises a transistor 31 and a sensor 33 coupled to the transistor 31; first selection circuitry 5 configured to sequence a subset of sensor cells 35 to which a gate input signal 6 is provided, wherein the gate input signal 6 is provided to the gate of the transistors 31 within the sensor cells 35; second selection circuitry 9 configured to sequence a subset of sensor cells 35 from which an output signal 8 is received; sensing signal circuitry 7 configured to provide a sensing signal 4, wherein the sensors 33 are provided between the sensing signal circuitry 7 and the second selection circuitry 9 such that the output signal 8 provides an indication of the impedance of the sensors 33.

Examples of the disclosure provide the technical effect of enabling the transistors 31 within the sensor arrangement 3 to be used as switches. This enables each of the sensor cells 35 to be addressed individually to enable the impedance of each sensor 33 to be measured separately. As only one transistor 31 is provided in each sensor cell 35 this ensures that the resistance within the sensor arrangement 3 is low enough to enable accurate measurements from the sensors 33.

The apparatus 1 may be for sensing. The apparatus 1 may be for sensing a plurality of different attributes.

FIG. 1 schematically illustrates an example apparatus 1 which may be provided in some examples of the disclosure. The apparatus 1 comprises a sensor arrangement 3, first selection circuitry 5, second selection circuitry 9 and sensing signal circuitry 7.

The sensor arrangement 3 may comprise a plurality of sensor cells 35. A sensor cell 35 may comprise a transistor 31 and a sensor 33 coupled to the transistor 31. In some of the examples each of the plurality of sensor cells 35 within the apparatus 1 may comprise a transistor 31 and a sensor 33 coupled to the transistor 31. In some examples only one transistor 31 may be provided within each sensor cell 35. The sensors 33 may be arranged within the sensor arrangement 3 so that they are positioned between the sensing signal circuitry 7 and the second selection circuitry 9. The sensors 33 may be arranged within the sensor arrangement 3 so that the output signal 8 provides a measurement of the electrical properties, such as impedance, of the sensors 33.

Figure 3:
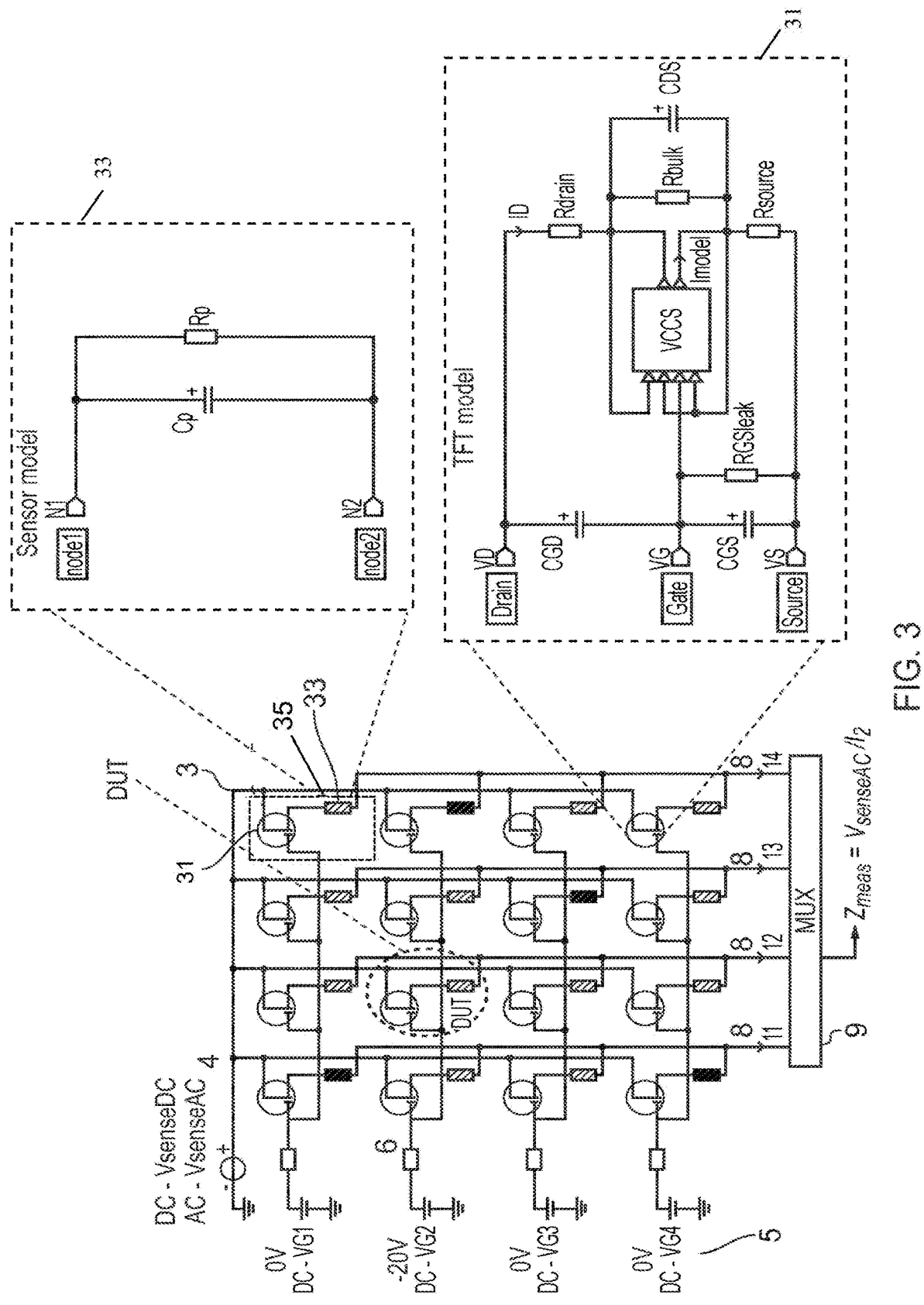
FIG. 3 schematically illustrates a sensor arrangement.
Figure 4:
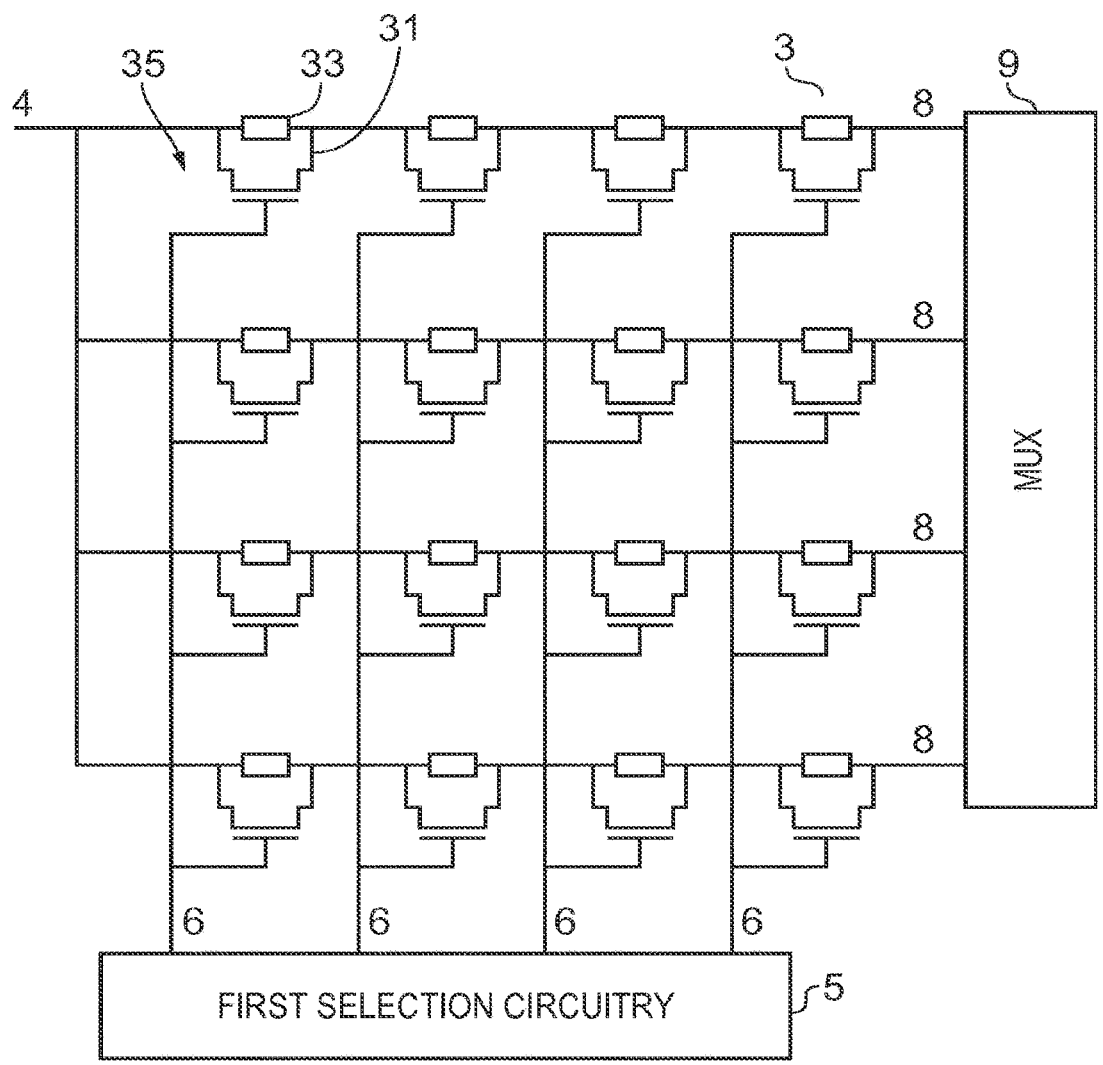
FIG. 4 schematically illustrates another sensor arrangement.

Examples of sensor arrangements 3 which may be used in implementations of the disclosure are illustrated in FIGS. 3 and 4. It is to be appreciated that other sensor arrangements 3 could be used in other examples.

The first selection circuitry 5 may comprise means for providing a gate input signal 6 to a selected subset of sensor cells 35 within the sensor arrangement 3. In some examples the first selection circuitry 5 may be configured to sequence the subset of sensor cells 35 to which the gate input signal 6 is provided. The gate input signal 6 may be sequentially provided to the gates of the transistors 31 within each of the sensor cells 35.

The second selection circuitry 9 may comprise means for sequencing a subset of sensor cells 35 from which an output signal 8 is received. In some examples the second selection circuitry 9 may comprise a multiplexer. In some examples the second selection circuitry 9 may comprise an analogue multiplexer. The output signal 8 may comprise a complex signal which may comprise both real and imaginary components. In some examples the second selection circuitry 9 may be coupled directly to the sensor arrangement 3 so that there is no processing or sampling of the output signal 8 before it is provided to the second selection circuitry 9.

The sensing signal circuitry 7 may comprise means for providing a sensing signal 4. The sensing signal 4 may by an AC (alternating current) signal. In such examples the frequency of the sensing signal 4 may be selected to optimise sensitivity of the sensors 33 within the sensor arrangement 3.

The apparatus 3 may be configured so that the output signal 8 obtained by the second selection circuitry 9 can be used to obtain information from each of the sensors 33 within the sensor arrangement 3. By controlling the first selection circuitry 5 and the second selection circuitry 9 each sensor cell 35 within the sensor arrangement 3 may be addressed individually. This may enable a measurement of the electrical properties, such as impedance, of each of the sensors 33 to be obtained. As the electrical properties of the sensors 33 are dependent on the sensed attributes these measurements provide information about the sensed attribute.

In some examples the output signal 8 which is obtained by the second selection circuitry 9 may be provided to analyzing circuitry 21 to enable information about the sensed attributes to be obtained.

Figure 2:
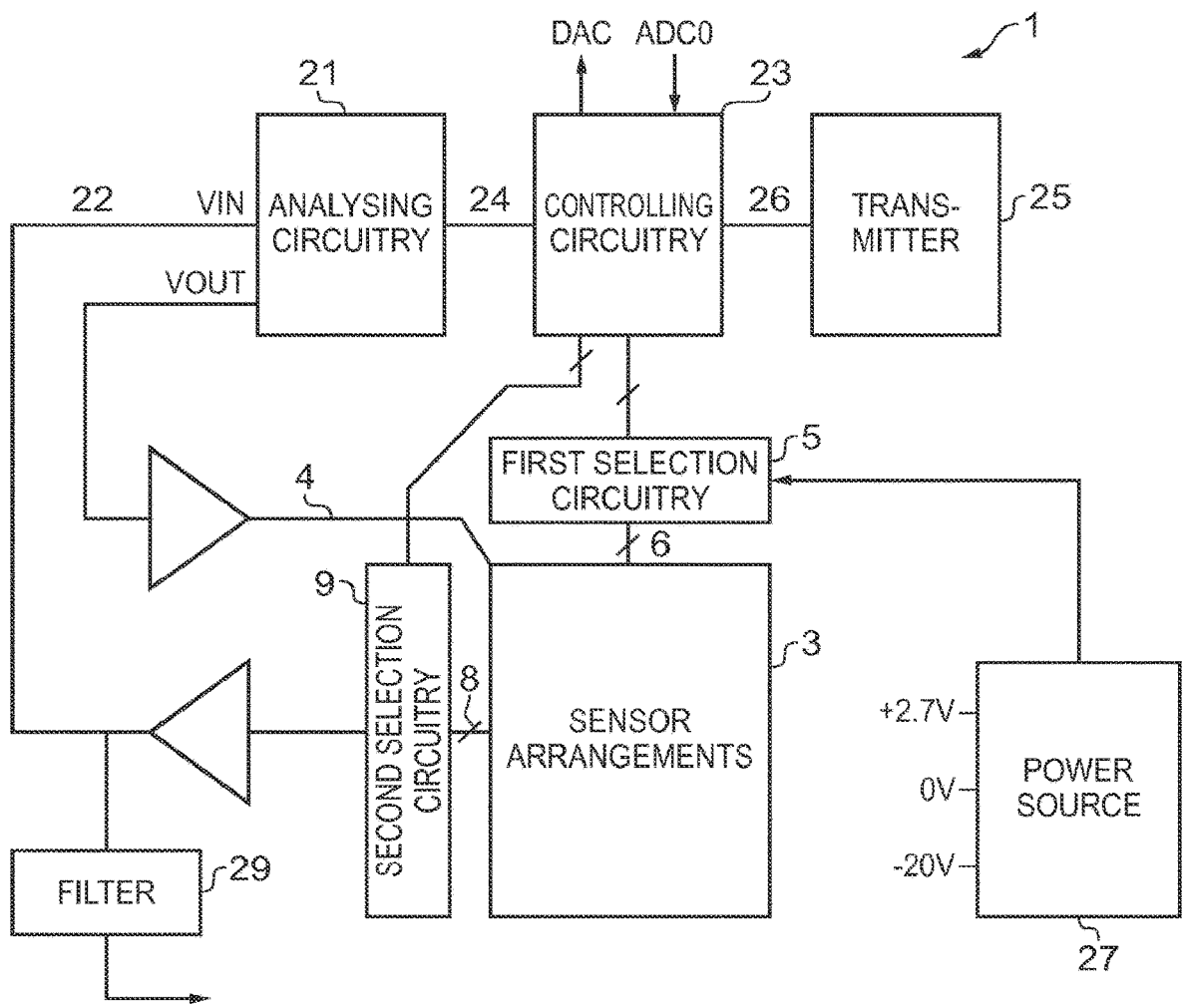
FIG. 2 illustrates another apparatus comprising read out electronics and a transmitter.

FIG. 2 schematically illustrates another example apparatus 1. The example apparatus 1 of FIG. 2 is configured to process the output signal 8 and then enable the processed signal to be transmitted to another device.

The example apparatus 1 of FIG. 2 also comprises a sensor arrangement 3, first selection circuitry 5 and second selection circuitry 9. The sensor arrangement 3, first selection circuitry 5 and second selection circuitry 9 may be as described above in relation to FIG. 1. The example apparatus of FIG. 2 also comprises analyzing circuitry 21, controlling circuitry 23, one or more transmitters 25, a power source 27 and a filter 29.

The analyzing circuitry 21 may comprise any means which may be configured to analyse a signal 22 provided by the second selection circuitry 9. The analyzing circuitry 21 may be configured to analyse the signal 22 provided by the second selection circuitry 9 to determine the current impedance of the different sensor cells 35 within the sensor arrangement 3.

In the example apparatus of FIG. 2 the analyzing circuitry 21 is configured to act as sensing signal circuitry 7 and provide the input signal 4 to the sensor arrangement 3. The analyzing circuitry 21 may comprise a frequency generator which may be configured to provide the input signal 4 to the sensor arrangement 3.

The input signal 4 is then provided to the sensors 33 within the sensor arrangement 3 so that the output signal 8 provides an indication of the impedance of the sensors 33. The output signal 8 is obtained by second selection circuitry 9. In the example of FIG. 2 there are no intervening components between the sensor arrangement 3 and the second selection circuitry 9. The signal which is provided by the second selection circuitry 9 to the analyzing circuitry 21 may be a complex signal which comprises both real components and imaginary components.

The signal 22 may comprise information relating to the impedance of a plurality of the sensors 33 within the sensor arrangement 3. In some examples an anti-aliasing filter 29 may be provided between the second selection circuitry 9 and the analyzing circuitry 21.

The analyzing circuitry 21 may be configured to sample the signal 22. In some examples the analyzing circuitry 21 may comprise an analogue to digital converter which may be configured to sample the signal 22. The sampled signal may then be analyzed to provide a data indicative of the real and imaginary components of the signal 22. For instance a discrete Fourier transform may be performed on the sampled signal. This data may be used to calculate the magnitude and/or phase of the impedance of each of the sensors 33 within the sensor arrangement 3.

The analyzing circuitry 21 may comprise any suitable circuitry. In some examples the analyzing circuitry 21 may comprise a vector network analyzer impedance converter or any other suitable circuitry.

The data which is obtained by the analyzing circuitry 21 may be provided to controlling circuitry 23 in a data signal 24. The controlling circuitry 23 may comprise means for controlling the apparatus 1. The controlling circuitry 23 may be configured to control the first selection circuitry 5 to control the sequencing of the gate input signal 6. The controlling circuitry 23 may also be configured to control the second selection circuitry 9. The controlling circuitry 23 may be configured to control the first selection circuitry 5 to control the sequencing of the subsets of the sensor cells 35 from which the output signal 8 is received. The controlling circuitry 23 may be configured to synchronize the first selection circuitry 5 and the second selection circuitry 9 to synchronize the sequencing of the subsets of the sensor cells 35 so that each sensor cell 35 can be measured separately.

The controlling circuitry 23 may also be configured to process the data signal 24 which is received from the analyzing circuitry 21. The received data signal 24 comprises data indicative of the measured impedances. The controlling circuitry 23 may be configured to use the received data signal 24 to determine the current impedance for different sensor cells 35 within the sensor arrangement 3. This may enable information about different sensed attributes to be obtained.

In the example of FIG. 2 the apparatus 1 also comprises one or more transmitters 25. The one or more transmitters 25 may comprise any means which enables the apparatus 1 to establish a communication connection with another device. The transmitter 25 may enable the apparatus 1 to exchange information with the another device. In some examples the another device could be another user device, such as a mobile phone or tablet computer, a server or any other suitable device.

The communication connection which is established by the transmitter 25 may comprise a wireless connection. In some examples the wireless communication connection may comprise a connection such as near field communication (NFC), Bluetooth, wireless local area network (wireless LAN), Bluetooth low energy (BTLE) or any other suitable connection. In some examples the connection may comprise a connection dedicated to the sensor so that only information associated with the sensor is transmitted using the connection.

In some examples the apparatus 1 may also comprise one or more receivers which may enable the apparatus 1 to receive information from other devices.

The one or more transmitters 25 may enable information which has been obtained from the sensor arrangement 3 to be transmitted to another device. This may enable information obtained by the sensors 33 in the sensor arrangement 3 to be transmitted to other devices.

The example apparatus 1 of FIG. 2 also comprises a power source 27. The power source may comprise any means which may be configured to provide power to the sensor arrangement 3. In some examples the power source 27 may comprise a battery or any other suitable means.

In the example of FIG. 2 the power source 27 is arranged to provide voltages between the range of +2.7V and −20V. It is to be appreciated that other ranges may be provided in other examples of the disclosure. In some examples the voltage range may depend on the gate voltage requirements of the transistors 31 within the sensor arrangement 3.

The apparatus of FIGS. 1 and 2 may be provided within a communication device. The communication device could be a handheld or wearable device which may be configured to be positioned close to the body of a user. In such examples the apparatus 1 may enable information about the parameters of the environment and/or status of a user to be collected and transmitted to another device.

FIG. 3 illustrates a sensor arrangement 3 which may be used in some examples of the disclosure. The example sensor arrangement 3 of FIG. 3 may be provided within apparatus 1 such as the apparatus of FIGS. 1 and 2. In the example sensor arrangement 3 of FIG. 3 the sensors 33 are connected in series with the transistors 31.

The sensor arrangement 3 may be coupled to first selection circuitry 5 and second selection circuitry 9. The first selection circuitry 5 and the second selection circuitry 9 may be as described above in relation to FIGS. 1 to 2. An input signal 4 may be provided by sensing signal circuitry 7. The second selection circuitry 9 may comprise a multiplexer as described above.

The sensor arrangement 3 comprises a plurality of sensor cells 35. In the example of FIG. 3 sixteen sensor cells 35 are provided in a four by four array. It is to be appreciated that any number and/or arrangement of sensor cells 35 may be provided in other examples of the disclosure.

In the example of FIG. 3 the sensor arrangement 3 comprises a distributed network of sensor cells 35 arranged as an array. The array comprises a plurality of rows and a plurality of columns. In the example illustrated in FIG. 3, the array is a regular array comprising regularly spaced parallel rows and regularly spaced parallel columns. In the illustrated example, the array is orthogonal in that the rows are orthogonal to the columns. It is to be appreciated that in some examples the array might not be regular and/or might not be orthogonal.

In the example of FIG. 3 each of the sensor cells 35 comprises a transistor 31 coupled to a sensor 33. Only one transistor 31 is provided in each of the sensor cells 35. In the example of FIG. 3 the sensor 33 is connected in series to the transistor 31. In the example of FIG. 3 there are no intervening components between the transistor 31 and the sensor 33.

The transistors 31 are arranged within the sensor arrangement 3 so that they are positioned between the sensing signal circuitry 7 and the second selection circuitry 9. The transistors 31 are arranged to act as switches for the sensors 33. The transistors 31 are arranged so that the source input signal is received from the sensing signal circuitry 7 and the drain signal is provided to the second selection circuitry 9. The gate input signal 6 is received from the first selection circuitry 5. The first selection circuitry 5 is arranged so that, by providing a gate input signal 6 to different subsets of sensor cells 35 at different times the different sensor cells 35 can be made active at different times.

The transistors 31 may comprise any suitable transistors 31. In some examples the transistors 31 may comprise thin film transistors or other similar transistors. In some examples the transistors 31 may comprise organic or inorganic thin film transistors. The transistors 31 may be formed using any suitable technique. For example the transistors 31 may be printed or deposited onto a substrate. Printed methods such as roll-to-roll printing, sheet to sheet printing, silk screen printing, or other printed electronics methods can be used depending on the materials used within the transistor 31.

The sensors 33 may comprise any means which may produce a measurable change in an electrical property in response to a sensed attribute. In the illustrated examples the sensors 33 are configured to produce a change in impedance. In the example of FIG. 3 the impedance of the sensor 33 is represented as a capacitance in parallel with a resistance which gives a time varying complex impedance.

The detected attribute which is sensed by the sensors 33 could be a user input such as a user touching the apparatus 1 or bending or deforming the apparatus 1. In some examples the detected attribute could comprise an environmental parameter, such as temperature, radiation the presence of chemicals or any other suitable attribute. The materials which are used within the sensors 33 may be selected in dependence of the attribute which is to be sensed.

In some examples the sensor 33 may comprise graphene oxide. This may enable the sensor 33 to detect attributes such as humidity, temperature or other suitable environmental parameters.

In some examples sensors 33 comprising graphene may be used to detect attributes such as UV (ultraviolet) and IR (infra red) radiation, chemicals such as antigens or other contaminants. In some examples graphene may be used to detect contaminants within water. This may enable the sensors 33 to be used in water purification systems or for ensuring water quality for food production and preparation or for any other suitable use.

In some examples sensors 33 comprising zinc oxide may be used to detect humidity or other environmental parameters such as gases or other chemicals. The zinc oxide may be provided in nanostructures or any other suitable form.

In some examples the sensors 33 may comprise materials which have capacitive transduction mechanism such as polysiloxane and methacrylic polymers, polyimide, poly (vinyl pyrrolidone), poly(vinyl alcohol), ceramic materials or any other suitable material. If the material has a capacitive transduction mechanism then the environmental parameter or other attributes may change the permittivity of the material. Such materials may be used to detect attributes such as temperature, infrared radiation, contaminants such as gases or any other suitable parameters.

In some examples the sensor 33 may comprise materials which may be configured to detect changes in shape or strain applied to the apparatus 1. This may enable the sensor arrangement 3 to be used to detect user inputs such as a user bending or otherwise deforming the apparatus. In some examples the sensors 33 may comprise carbon structures such as carbon nanotubes which may have an impedance which changes when the sensor 33 is deformed. In some examples the sensors 33 may comprise a piezoelectric material such as PZT (lead zirconate titanate), Zinc Oxide or any other suitable material.

The sensors 33 are provided between the sensing signal circuitry 7 and the second selection circuitry 9 so that the output signal 8 provides a measurement of the impedance of the sensors 33.

The apparatus 1 may be configured so that each of the sensor cells 35 in the sensor arrangement 3 may be separately measured. The first selection circuitry 5 may be configured to direct the gate input signal 6 to a particular subset of sensor cells 35. The first selection circuitry 5 may be configured to direct the gate input signal 6 to a particular row of sensor cells 35. The gate input signal is provided to the gate of the transistors 31 to enable the transistors 31 to act as switches.

The second selection circuitry 9 may be configured to direct the output signal 8 from a particular subset of sensor cells 35. The second selection circuitry 9 may be configured to direct the output signal 8 from a particular column of sensor cells 35.

The first selection circuitry 5 and the second selection circuitry 7 may be synchronised so that they simultaneously direct the gate input signal 6 to and direct the output signal 8 from, the same active sensor cell 35. In some examples the synchronization of the first selection circuitry 5 and the second selection circuitry 7 may be controlled by controlling circuitry 23.

The first selection circuitry 5 may be configured to sequence the row to which the gate input signal 6 is provided through a series of different rows. Each row may be made active once in a given time period. The second selection circuitry 9 may be configured to sequence the column from which the output signal 8 is received through a series of different columns. Each column may be made active once in the given time period.

In some examples the gate input signal 6 and the output signal 8 may have regular time sequences where each cell is addressed as frequently and for the same amount of time as all the other cells. In other examples the signals may have an irregular time sequence so that some cells are addressed more frequently than others and/or for a longer period of time.

It is to be appreciated that although it is described that gate input signal 6 is provided to rows and the output signal 8 is taken from columns, this may be reversed. For instance in other examples the gate input signal 6 may be provided to columns and the output signal 8 may be taken from rows.

Depending upon context, the terms "row" and "column" may therefore be interchanged.

FIG. 4 illustrates another sensor arrangement 3 which may be used in some examples of the disclosure. The example sensor arrangement 3 of FIG. 4 may be provided within apparatus 1 such as the apparatus of FIGS. 1 and 2. In the example sensor arrangement 3 of FIG. 4 the sensor arrangement 35 comprises a plurality of sensor cells 35 each comprising a transistor 31 and a sensor 33. The transistors 31 and the sensors 33 may be as described previously. The sensor arrangement 3 of FIG. 4 differs from the sensor arrangement 3 of FIG. 3 in that, in FIG. 4, the sensors 33 are connected in parallel with the transistors 31 rather than in series.

In the example of FIG. 4 the first selection circuitry 5 is configured to enable the gate input signal 6 to be provided to different columns of the sensor arrangement 3 and the second selection circuitry 9 is configured to enable the output signal 8 to be taken from different rows. It is to be appreciated that the operation of the first selection circuitry 5 and the second selection circuitry 9 may be as described previously. It is also to be appreciated that other examples the gate input signal 6 may be provided to rows and the output signal 8 may be taken from columns.

Figure 5:
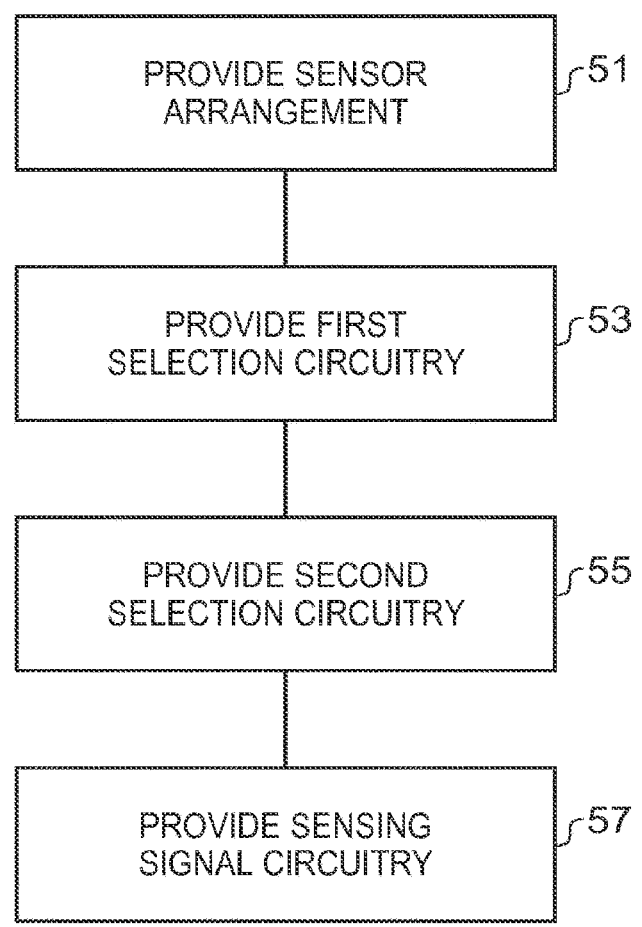
FIG. 5 illustrates a method.

FIG. 5 illustrates a method. The method may be used to provide apparatus such as the apparatus described above with reference to FIGS. 1 to 4.

The method comprises, providing, at block 51 a sensor arrangement 3 comprising a plurality of sensor cells 35 wherein a sensor cell 35 comprises a transistor 31 and a sensor 33 coupled to the transistor 31. At block 53 the method comprises providing first selection circuitry 5 configured to sequence a subset of sensor cells 35 to which a gate input signal 6 is provided, wherein the gate input signal 6 is provided to the gate of the transistors 31 within the sensor cells 35.

The method also comprises providing, at block 55, second selection circuitry 9 configured to sequence a subset of sensor cells 35 from which an output signal is received and providing at block 57, sensing signal circuitry 7 configured to provide a sensing signal 4, wherein the sensors 33 are provided between the sensing signal circuitry 7 and the second selection circuitry 9 such that the output signal provides an indication of the impedance of the sensors 33.

Figure 6:
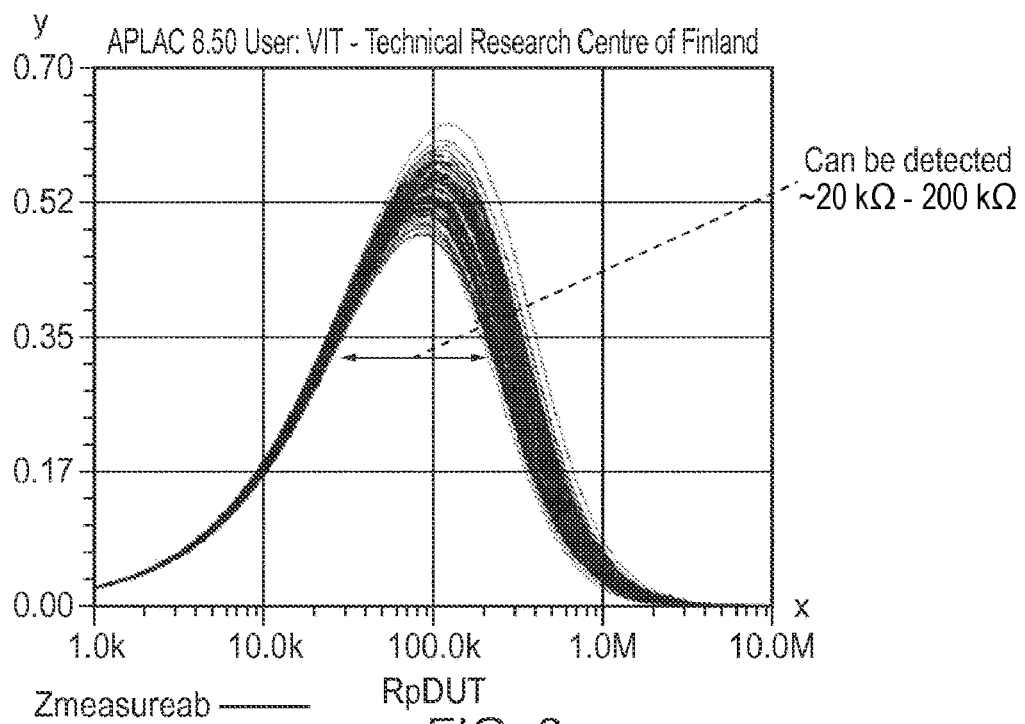
FIG. 6 illustrates a plot of sensor sensitivity sampled with a first frequency.

FIG. 6 illustrates a plot of sensor sensitivity for an example device where the data is sampled with a first frequency. Sensor sensitivity is plotted on the y axis and impedance Z is plotted on the x axis. Sensor sensitivity (figure of merit) is given by d|Zmeas|/dR-pDUT, RpDUT/|Zmeas|. The data plotted in FIG. 6 was obtained using 5 kHz sampling frequency.

The plot of FIG. 6 shows that sensitivity of the sensor cell 35 is good enough for reliable measurement when the impedance of the sensor 33 is in the range 20 k$\Omega$ to 200 k$\Omega$. The impedance of the transistor 31 should be significantly smaller than the resistance of the device under test (sensor 33). For high sensor 33 impedances the resistance of the device under test is larger than the impedances of the channel of the transistor 31 which are arranged as switches.

Figure 7:
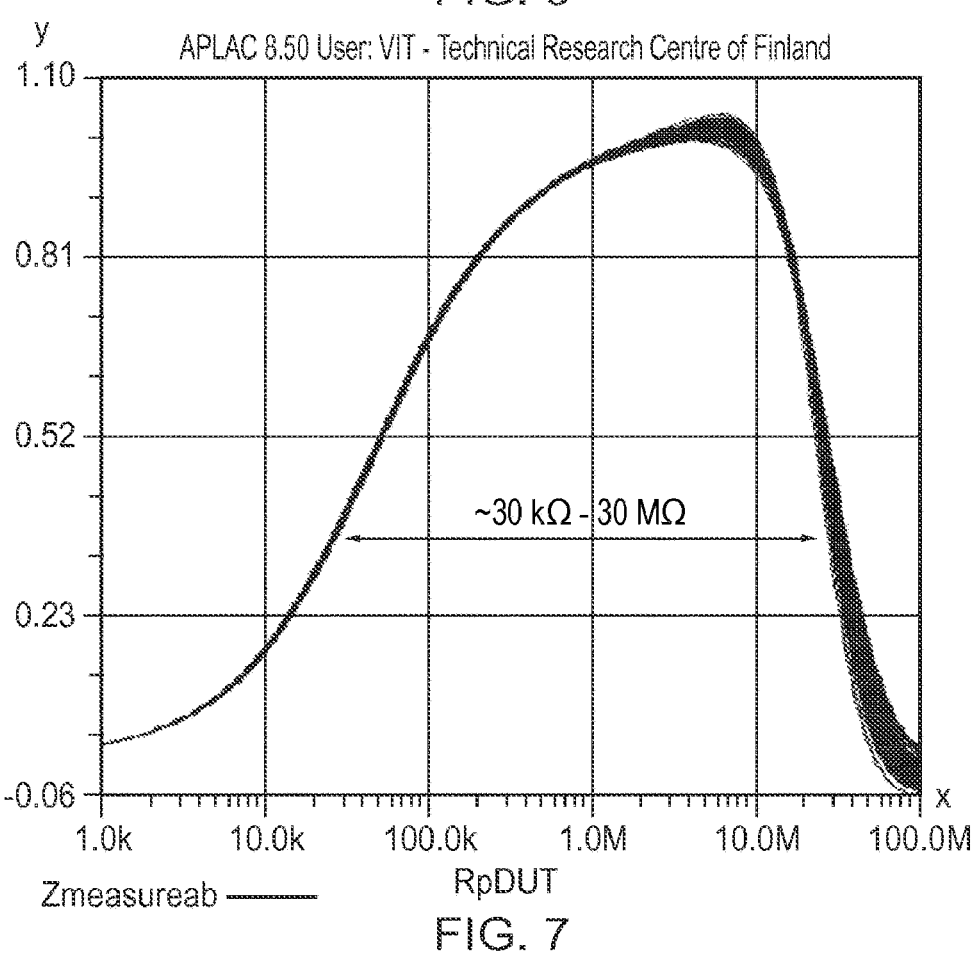
FIG. 7 illustrates another plot of sensor sensitivity sampled with a second frequency.

FIG. 7 illustrates another plot of sensor sensitivity where the data was sampled with a second frequency. In this plot the sampling frequency was 100 Hz. The use of the lower frequency increases the sensitivity of the sensor so that the detection range is widened to between 30 k$\Omega$ to 30 M$\Omega$.

It is to be appreciated that the sampling frequency which is used in examples of the disclosure may depend upon the sensors 33 and transistors 31 which are used.

Examples of the disclosure provide for a sensor arrangement 3 which only comprises a single transistor 31 in each of the sensor cells 35. This reduces the number of connections needed to address each sensor cell individually. The reduced number of connection lines needed may enable arrays comprising a large number of sensor cells 35 to be provided. For instance in some examples the array may comprise more than 100 sensors cells 35 in each column and/or row.

Having only a single transistor 31 in each of the sensor cells 35 may also reduce the resistance of each sensor cell and may enable a wider measurement range for the sensor 33. In the example of FIG. 3 the resistance in series with the sensor 33 may be low enough to enable accurate measurements from the sensors 33. In the example of FIG. 4 the resistance in parallel with the sensor 33 may be low enough to enable accurate measurements from the sensors 33.

The sensor arrangement 3 may be formed by printing and may provide a small and compact sensing device. The sensing device may be integrated into wearable electronics or into portable electronic devices such as mobile telephones. This may enable the sensor arrangement 3 to be used to be used to monitor the environment of the user. For instance it could be used to monitor a user's exposure to harmful or potentially harmful parameters such as heat, radiation such as UV radiation or IR radiation, contaminants which could be harmful to a user or any other suitable parameters.

In some examples the information which is obtained by the sensor arrangement could be provided to other devices via one or more transmitters. This may enable the other device to monitor the conditions to which the apparatus has been exposed and may enable a warning, or other action, to be enabled if the exposure exceeds a given threshold.

In some examples the sensor arrangement 3 could be configured to detect user inputs such as a user bending or otherwise deforming the apparatus 1. This may enable the same components to be used to detect environmental parameters and also user inputs.

The controlling circuitry 23 previously described may be implemented using instructions that enable hardware functionality, for example, by using executable computer program instructions in a general-purpose or special-purpose processing circuitry that may be stored on a computer readable storage medium (disk, memory etc) to be executed by such processing circuitry.

Processing circuitry may be configured to read from and write to memory circuitry. The processing circuitry may also comprise an output interface via which data and/or commands are output by the processing circuitry and an input interface via which data and/or commands are input to the processing circuitry.

The memory circuitry may be configured to store a computer program comprising computer program instructions that control the operation of the apparatus 1 when loaded into the processing circuitry. The computer program instructions provide the logic and routines that enable the apparatus to perform the methods described. The processing circuitry by reading the memory circuitry is able to load and execute the computer program.

The apparatus 1 therefore comprises: processing circuitry and memory circuitry including computer program code, the at least one memory and the computer program code configured to, with the processing circuitry, cause the analysing circuitry 21 to perform as described.

The computer program may arrive at the apparatus 1 via any suitable delivery mechanism. The delivery mechanism may be, for example, a non-transitory computer-readable storage medium, a computer program product, a memory device, a record medium such as a compact disc read-only memory (CD-ROM) or digital versatile disc (DVD), an article of manufacture that tangibly embodies the computer program. The delivery mechanism may be a signal configured to reliably transfer the computer program. The apparatus 1 may propagate or transmit the computer program as a computer data signal.

In some examples the memory circuitry may be implemented as a single component it may be implemented as one or more separate components some or all of which may be integrated/removable and/or may provide permanent/semi-permanent/dynamic/cached storage.

References to "computer-readable storage medium", "computer program product", "tangibly embodied computer program" etc. or a "controller", "computer", "processor" etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term "circuitry" refers to all of the following:
(a) hardware-only circuit implementations (such as implementations in only analog and/or digital circuitry) and
(b) combinations of circuits and software (and/or firmware), such as (as applicable): (i) a combination of processor(s) or (ii) portions of processor(s)/software (including digital signal processor(s)), software, and memory(ies) that work together to cause an apparatus, such as a mobile phone or server, to perform various functions) and
(c) circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device."

The blocks illustrated in the FIG. 5 do not necessarily imply that there is a required or preferred order for the blocks and the order and arrangement of the block may be varied. Furthermore, it may be possible for some blocks to be omitted.

The term "comprise" is used in this document with an inclusive not an exclusive meaning. That is any reference to X comprising Y indicates that X may comprise only one Y or may comprise more than one Y. If it is intended to use "comprise" with an exclusive meaning then it will be made clear in the context by referring to "comprising only one . . . " or by using "consisting".

In this brief description, reference has been made to various examples. The description of features or functions in relation to an example indicates that those features or functions are present in that example. The use of the term "example" or "for example" or "may" in the text denotes, whether explicitly stated or not, that such features or functions are present in at least the described example, whether described as an example or not, and that they can be, but are not necessarily, present in some of or all other examples. Thus "example", "for example" or "may" refers to a particular instance in a class of examples. A property of the instance can be a property of only that instance or a property of the class or a property of a sub-class of the class that includes some but not all of the instances in the class. It is therefore implicitly disclosed that a features described with reference to one example but not with reference to another example, can where possible be used in that other example but does not necessarily have to be used in that other example.

Although examples of the disclosure have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. An apparatus comprising:
a sensor arrangement comprising a plurality of sensor cells, wherein each sensor cell of the plurality of sensors cells comprises a single transistor electrically coupled to a sensor, wherein a first sensor cell of the plurality of sensor cells comprises a first single transistor electrically coupled to a first sensor, the first sensor comprising a first material having an impedance which changes in response to a first sensed attribute, and wherein a second sensor cell of the plurality of sensor cells comprises a second single transistor electrically coupled to a second sensor, the second sensor comprising a second material having an impedance which changes in response to a second sensed attribute;
first selection circuitry configured to provide a gate input signal to a gate of the first single transistor in order to cause the first sensor to sense the first sensed attribute based upon a change in impedance and a gate of the second single transistor in order to cause the second sensor to sense the second sensed attribute based upon a change in impedance;
second selection circuitry comprising an analogue multiplexer configured to receive a complex output signal from the first sensor cell or the second sensor cell, wherein the complex output signal comprises both real and imaginary components; and sensing signal circuitry configured to provide an alternating current sensor input signal to one of the first sensor cell or the second sensor cell, wherein the sensor arrangement is electrically coupled at a first end to the second selection circuitry and electrically coupled at a second end to the sensing signal circuitry such that the complex output signal provides an indication of the impedance of one of the first sensor cell or the second sensor cell, wherein the indication of the impedance provided by the complex output signal provides sensed attribute information about one of the first sensed attribute and the second sensed attribute, and wherein the alternating current sensor input signal has a frequency that is sufficiently low such that the apparatus is configured to detect the impedance of the first sensor or the second sensor in a range between 30 kΩ and 30 MΩ.

2. The apparatus as claimed in claim 1, wherein the plurality of sensor cells are arranged in a plurality of rows of sensor cells and a plurality of columns of sensor cells, and wherein the plurality of columns of sensor cells are orthogonal to the plurality of rows of sensor cells.

3. The apparatus as claimed in claim 2, wherein the first selection circuitry is configured to iteratively activate and then deactivate different rows of sensor cells and the second selection circuitry is configured to iteratively activate and then deactivate different columns of sensor cells, thereby selecting one of the first sensor cell or the second sensor cell to cause the complex output signal to be received at the second selection circuitry, wherein the complex output signal is indicative of a respective one of the first sensed attribute or the second sensed attribute.

4. The apparatus as claimed in claim 2, wherein the first selection circuitry is configured to iteratively activate and then deactivate different columns of sensor cells and the second selection circuitry is configured to iteratively activate and then deactivate different rows of sensor cells, thereby selecting one of the first sensor cell or the second sensor cell causes the complex output signal to be received at the second selection circuitry, wherein the complex output signal is indicative of a respective one of the first sensed attribute or the second sensed attribute.

5. The apparatus as claimed in claim 2, wherein the first sensor cell and the second sensor cell are in a first row of sensor cells.

6. The apparatus as claimed in claim 2, wherein the plurality of sensor cells are electrically coupled in series between the first selection circuitry or the second selection circuitry and the sensing signal circuitry.

7. The apparatus as claimed in claim 1, wherein the sensor is connected in series with the single transistor within each sensor cell of the plurality of sensor cells.

8. The apparatus as claimed in claim 1, wherein the sensor is connected in parallel with the single transistor within each sensor cell of the plurality of sensor cells.

9. The apparatus as claimed in claim 1, wherein the single transistor in each sensor cell of the plurality of sensor cells comprises an organic thin film transistor (OTFT).

10. The apparatus as claimed in claim 1, wherein the alternating current sensing signal is selected to optimize sensitivity of the plurality of sensor cells within the sensor arrangement.

11. The apparatus as claimed in claim 1, wherein the plurality of sensor cells comprises a third sensor cell comprising a third single transistor electrically coupled to a third sensor, the third sensor comprising a material having a resistance which changes in response to a third sensed attribute.

12. The apparatus as claimed in claim 1, wherein the plurality of sensor cells comprises a third sensor cell comprising a third single transistor electrically coupled to a third sensor, the third sensor comprising a material having a permittivity which changes in response to a third sensed attribute.

13. The apparatus as claimed in claim 1, wherein the first sensed attribute and the second sensed attribute are selected from among: a temperature, a relative humidity, visible light, ultraviolet radiation, infrared radiation, a chemical concentration, and an antigen concentration.

14. The apparatus of claim 1, further comprising:
controlling circuitry configured to, in response to receiving external instructions, to:
in a first instance in which the external instructions comprise an instruction to sense for the first sensed attribute, cause the first selection circuitry to send the gate input signal to the gate of the first single transistor in order to cause the first sensor to sense the first sensed attribute, and
in a second instance in which the external instructions comprise an instruction to sense for the second sensed attribute, cause the first selection circuitry to send the gate input signal to the gate of the second single transistor in order to cause the second sensor to sense the second sensed attribute.

15. The apparatus of claim 14, further comprising:
one or more transmitters configured to transmit sensed attribute information to an external device.

16. The apparatus of claim 15, wherein the sensed attribute information comprises or is determined based at least upon said indication of the impedance of one of the first sensor cell or the second sensor cell, the impedance being indicative of a magnitude of one of the first sensed attribute or the second sensed attribute.

17. A communication device comprising an apparatus, said apparatus comprising:
a sensor arrangement comprising a plurality of sensor cells, wherein a first sensor cell of the plurality of sensor cells comprises a first single transistor and a first sensor, the first single transistor being electrically coupled to the first sensor, the first sensor comprising a first material having an impedance which changes in response to a first sensed attribute, and wherein a second sensor cell of the plurality of sensor cells comprises a second single transistor and a second sensor, the second single transistor being electrically coupled to the second sensor, the second sensor comprising a second material having an impedance which changes in response to a second sensed attribute;
first selection circuitry configured to provide a gate input signal to a gate of the first single transistor in order to cause the first sensor to sense the first sensed attribute based upon a change in impedance or provide the gate input signal to a gate of the second single transistor in order to cause the second sensor to sense the second sensed attribute based upon a change in impedance;
second selection circuitry comprising an analogue multiplexer configured to receive a complex output signal from one of the first sensor cell or the second sensor cell, wherein the complex output signal comprises both real and imaginary components;

controlling circuitry configured, in response to receiving external instructions, to:
  in a first instance in which the external instructions comprise an instruction to sense for the first sensed attribute, cause the first selection circuitry to send the gate input signal to the gate of the first single transistor in order to cause the first sensor to sense the first sensed attribute, and
  in a second instance in which the external instructions comprise an instruction to sense for the second sensed attribute, cause the first selection circuitry to send the gate input signal to the gate of the second single transistor in order to cause the second sensor to sense the second sensed attribute; the communication device further comprising:
sensing signal circuitry configured to provide an alternating current sensor input signal to one of the first sensor cell and the second sensor cell of the plurality of sensor cells,
wherein the sensor arrangement is electrically coupled at a first end to the second selection circuitry and electrically coupled at a second end to the sensing signal circuitry such that providing the alternating current sensor input signal to one of the first and second sensor cells causes the complex output signal to provide an indication of the impedance of one of the first and the second sensor cells of the plurality of sensor cells, wherein the indication of the impedance provided by the complex output signal provides sensed attribute information about one of the first sensed attribute and the second sensed attribute, and wherein the one or more alternating current sensor input signals each have a frequency that is sufficiently low such that the apparatus is configured to detect the impedance of the first sensor or the second sensor in a range between 30 kΩ and 30 MΩ.

18. The communication device as claimed in claim 17, wherein the plurality of sensor cells are arranged in a plurality of rows of sensor cells and a plurality of columns of sensor cells, and wherein the plurality of columns of sensor cells are orthogonal to the plurality of rows of sensor cells.

19. The communication device as claimed in claim 18, wherein the first selection circuitry is configured to iteratively activate and then deactivate different rows of sensor cells and the second selection circuitry is configured to iteratively activate and then deactivate different columns of sensor cells, thereby selecting one of the first sensor cell or the second sensor cell to cause the complex output signal to be received at the second selection circuitry, wherein the complex output signal is indicative of a respective one of the first sensed attribute or the second sensed attribute.

20. The communication device as claimed in claim 18, wherein the first selection circuitry is configured to iteratively activate and then deactivate different columns of sensor cells and the second selection circuitry is configured to iteratively activate and then deactivate different rows of sensor cells, thereby selecting one of the first sensor cell or the second sensor cell causes the complex output signal to be received at the second selection circuitry, wherein the complex output signal is indicative of a respective one of the first sensed attribute or the second sensed attribute.

21. The communication device as claimed in claim 18, wherein the plurality of sensor cells are electrically coupled in series between the first selection circuitry or the second selection circuitry and the sensing signal circuitry.

22. The communication device as claimed in claim 17, wherein the plurality of sensor cells comprises a third sensor cell comprising a third single transistor electrically coupled to a third sensor, and wherein the third sensor comprises a material having a resistance which changes in response to a third sensed attribute.

23. The communication device as claimed in claim 17, wherein the plurality of sensor cells comprises a third sensor cell comprising a third single transistor electrically coupled to a third sensor, and wherein the third sensor comprises a material having a permittivity which changes in response to a third sensed attribute.

24. The communication device as claimed in claim 17, wherein the first sensed attribute and the second sensed attribute are selected from among: a temperature, a relative humidity, visible light, ultraviolet radiation, infrared radiation, a chemical concentration, and an antigen concentration.

25. The communication device as claimed in claim 17, wherein the sensor is connected in series with the single transistor within each sensor cell of the plurality of sensor cells.

26. The communication device as claimed in claim 17, wherein the sensor is connected in parallel with the single transistor within each sensor cell of the plurality of sensor cells.

27. The communication device as claimed in claim 17, wherein the single transistor in each sensor cell of the plurality of sensor cells comprises an organic thin film transistor (OTFT).

28. The communication device as claimed in claim 17, wherein the alternating current sensing signal is selected to optimize sensitivity of the plurality of sensor cells within the sensor arrangement.

29. The communication device as claimed in claim 17, wherein the plurality of sensor cells comprises a third sensor cell comprising a third single transistor electrically coupled to a third sensor, the third sensor comprising a material having a resistance which changes in response to a third sensed attribute.

30. The communication device as claimed in claim 17, wherein the plurality of sensor cells comprises a third sensor cell comprising a third single transistor electrically coupled to a third sensor, the third sensor comprising a material having a permittivity which changes in response to a third sensed attribute.

31. The communication device as claimed in claim 17, further comprising at least one transmitter configured to transmit sensed attribute information obtained from the complex output signal.

32. The communication device of claim 31, wherein the at least one transmitter is configured to transmit the sensed attribute information to an external device, and wherein the sensed attribute information comprises or is determined based at least upon said indication of the impedance of one of the first sensor cell or the second sensor cell, the impedance being indicative of a magnitude of one of the first sensed attribute or the second sensed attribute.

33. A method comprising:
  providing a sensor arrangement comprising a plurality of sensor cells, wherein each sensor cell of the plurality of sensor cells comprises a single transistor electrically coupled to a sensor, wherein a first sensor cell of the plurality of sensor cells comprises a first single transistor electrically coupled to a first sensor, the first sensor comprising a first material having an impedance which changes in response to a first sensed attribute, and wherein a second sensor cell of the plurality of sensor cells comprises a second single transistor electrically coupled to a second sensor, the second sensor comprising a second material having an impedance which changes in response to a second sensed attribute;

providing first selection circuitry configured to provide a gate input signal to a gate of the first single transistor in order to cause the first sensor to sense the first sensed attribute based upon a change in impedance and a gate of the second single transistor in order to cause the second sensor to sense the second sensed attribute based upon a change in impedance;

providing second selection circuitry, the second selection circuitry comprising an analogue multiplexer configured to receive a complex output signal from one of the first sensor cell or the second sensor cell, wherein the complex output signal comprises both real and imaginary components; and providing sensing signal circuitry configured to provide an alternating current sensor input signal to one of the first sensor cell or the second sensor cell, wherein the sensor arrangement is electrically coupled at a first end to the second selection circuitry and electrically coupled at a second end to the sensing signal circuitry such that the complex output signal provides an indication of the impedance of one of the first sensor cell or the second sensor cell, wherein the indication of the impedance provided by the complex output signal provides sensed attribute information about one of the first sensed attribute and the second sensed attribute, and wherein the alternating current sensor input signal has a frequency that is sufficiently low such that the impedance of the first sensor or the second sensor is able to be detected in a range between 30 k$\Omega$ and 30 M$\Omega$.

34. The method as claimed in claim 33, wherein the plurality of sensor cells are arranged in a plurality of rows of sensor cells and a plurality of columns of sensor cells, and wherein the plurality of columns of sensor cells are orthogonal to the plurality of rows of sensor cells.

35. The method as claimed in claim 34, wherein the first selection circuitry is configured to iteratively activate and then deactivate different rows of sensor cells and the second selection circuitry is configured to iteratively activate and then deactivate different columns of sensor cells, thereby selecting one of the first sensor cell or the second sensor cell to cause the complex output signal to be received at the second selection circuitry, wherein the complex output signal is indicative of a respective one of the first sensed attribute or the second sensed attribute.

36. The method as claimed in claim 34, wherein the first selection circuitry is configured to iteratively activate and then deactivate different columns of sensor cells and the second selection circuitry is configured to iteratively activate and then deactivate different rows of sensor cells, thereby selecting one of the first sensor cell or the second sensor cell causes the complex output signal to be received at the second selection circuitry, wherein the complex output signal is indicative of a respective one of the first sensed attribute or the second sensed attribute.

37. The method as claimed in claim 33, wherein the first sensed attribute and the second sensed attribute are selected from among: a temperature, a relative humidity, visible light, ultraviolet radiation, infrared radiation, a chemical concentration, and an antigen concentration.

38. The method as claimed in claim 33, further comprising:
causing, during a first time, the first selection circuitry to provide the gate signal to the gate of the first single transistor to cause the first sensor of the first sensor cell to sense the impedance through the first material;
causing, during the first time, the second selection circuitry to select the first sensor cell from which the second selection circuitry is to receive the complex output signal;
causing, during the first time, the second selection circuitry to receive, from the first sensor cell, the complex output signal; and
calculating, based at least upon the complex output signal received during the first time and the sensor cell selected by the second selection circuitry during the first time, the magnitude of the first sensed attribute.

39. The method as claimed in claim 38, further comprising:
causing, during a second time subsequent to the first time, the first selection circuitry to provide the gate signal to the gate of the second single transistor to cause the second sensor of the second sensor cell to sense the impedance through the second material;
causing, during the second time, the second selection circuitry to select the second sensor cell from which the second selection circuitry is to receive the complex output signal;
causing, during the second time, the second selection circuitry to receive, from the second sensor cell, the complex output signal; and
calculating, based at least upon the complex output signal received during the second time and the sensor cell selected by the second selection circuitry during the second time, the magnitude of the second sensed attribute.

40. The communication device as claimed in claim 39, wherein the first sensor cell and the second sensor cell are in a first row of sensor cells.

41. The method of claim 33, further comprising:
providing controlling circuitry configured to receive external instructions for sensing a sensed attribute, and, in response to the external instructions, cause sensing of the sensed attribute.

42. The method of claim 41, further comprising:
in a first instance in which the external instructions comprise an instruction to sense for the first sensed attribute, causing the first selection circuitry to send the gate input signal to the gate of the first single transistor in order to cause the first sensor to sense the first sensed attribute; and
in a second instance in which the external instructions comprise an instruction to sense for the second sensed attribute, causing the first selection circuitry to send the gate input signal to the gate of the second single transistor in order to cause the second sensor to sense the second sensed attribute.

* * * * *